United States Patent
Li et al.

(10) Patent No.: US 6,429,155 B2
(45) Date of Patent: *Aug. 6, 2002

(54) LOW PERMEABILITY AIRBAG CUSHIONS HAVING FILM COATINGS OF EXTREMELY LOW THICKNESS

(75) Inventors: Shulong Li, Spartanburg, SC (US); John A. Sollars, Jr., LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 4 days.

This patent is subject to a terminal disclaimer.

(21) Appl. No.: 09/767,250

(22) Filed: Jan. 22, 2001

Related U.S. Application Data

(63) Continuation-in-part of application No. 09/557,643, filed on Apr. 25, 2000, which is a continuation-in-part of application No. 09/501,467, filed on Feb. 9, 2000, which is a continuation-in-part of application No. 09/350,620, filed on Jul. 9, 1999, now Pat. No. 6,177,366, application No. 09/335,257, filed on Jun. 17, 1999, now Pat. No. 6,177,365, application No. 09/767,250, filed on Jan. 22, 2001, which is a continuation-in-part of application No. 09/406,264, filed on Sep. 24, 1999, now Pat. No. 6,220,309.

(51) Int. Cl.⁷ .............................. B32B 5/18; B60R 21/16
(52) U.S. Cl. .................. 442/76; 280/728.1; 280/730.2; 428/34.1; 428/34.3; 428/36.1; 442/65; 442/182; 442/239; 442/242; 442/248; 442/249; 442/250
(58) Field of Search .......................... 442/65, 76, 182, 442/239, 242, 248, 249, 250; 428/34.1, 34.3, 36.1; 280/728.1, 730.2

(56) References Cited

U.S. PATENT DOCUMENTS

| | | | |
|---|---|---|---|
| 3,705,645 A | 12/1972 | Konen | 206/46 |
| 4,217,256 A | 8/1980 | Peerman et al. | 260/18 |
| 4,921,735 A | 5/1990 | Bloch | 428/34.9 |
| 4,994,225 A | 2/1991 | Davis | 264/257 |
| 5,011,183 A | 4/1991 | Thornton et al. | 280/743 |
| 5,098,125 A | 3/1992 | Thornton et al. | 280/743 |
| 5,110,666 A | 5/1992 | Menzel et al. | 428/196 |
| 5,114,180 A | 5/1992 | Kami et al. | 280/743 |
| 5,208,097 A | 5/1993 | Homma et al. | 428/35.7 |
| 5,213,363 A | 5/1993 | Fukumori et al. | 280/743 |
| 5,336,538 A | 8/1994 | Kitamura | 428/226 |
| 5,399,402 A | 3/1995 | Inoue et al. | 428/35.7 |
| 5,421,378 A | 6/1995 | Bower et al. | 139/435.1 |
| 5,503,197 A | 4/1996 | Bower et al. | 139/435.1 |
| 5,529,837 A | 6/1996 | Fujiki et al. | 428/266 |
| 5,651,395 A | 7/1997 | Graham et al. | 139/390 |
| 5,685,347 A | 11/1997 | Graham et al. | 139/390 |
| 5,707,711 A | 1/1998 | Kitamura | 428/193 |
| 5,865,464 A | 2/1999 | Kanuma et al. | 280/743.1 |

OTHER PUBLICATIONS

ASTM D737–96, "Standard Test Method for Air Permeability of Textile Fabrics" (Date Unknown).

*Primary Examiner*—Cheryl A. Juska
*Assistant Examiner*—Arti R. Singh
(74) *Attorney, Agent, or Firm*—Terry T. Moyer; William S. Parks

(57) ABSTRACT

Coated inflatable fabrics, more particularly airbags to which very low add-on amounts of coating have been applied, are provided which exhibit extremely low air permeability. The inventive inflatable fabrics are primarily for use in automotive restraint cushions that require low permeability characteristics (such as side curtain airbags). Traditionally, heavy, and thus expensive, coatings of compounds such as neoprene, silicones and the like, have been utilized to provide such required low permeability. The inventive fabric utilizes an inexpensive, very thin coating to provide such necessarily low permeability levels. Thus, the inventive coated inflatable airbag comprises a film laminated on at least a portion of the target fabric surface wherein the film possesses a tensile strength of at least 2,000 and an elongation at break of at least 180%. The film provides a low permeability airbag cushion exhibiting a leak-down time of at least 5 seconds as well as a very low packing volume (for more efficient use of storage space within a vehicle) for the target side curtain airbag.

40 Claims, 3 Drawing Sheets

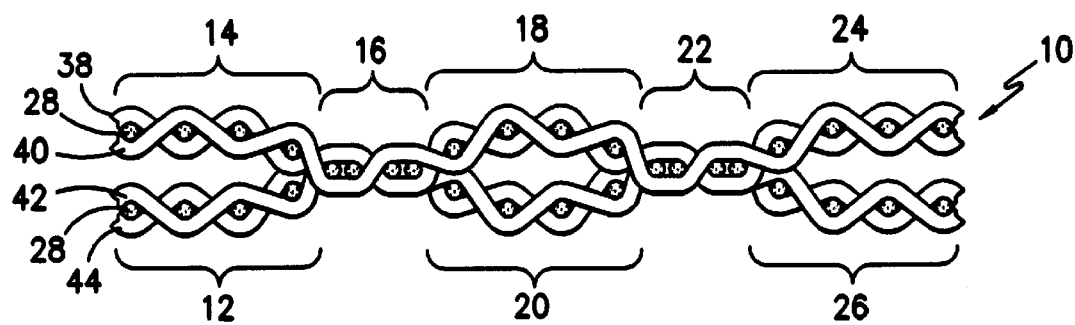
FIG. -1-
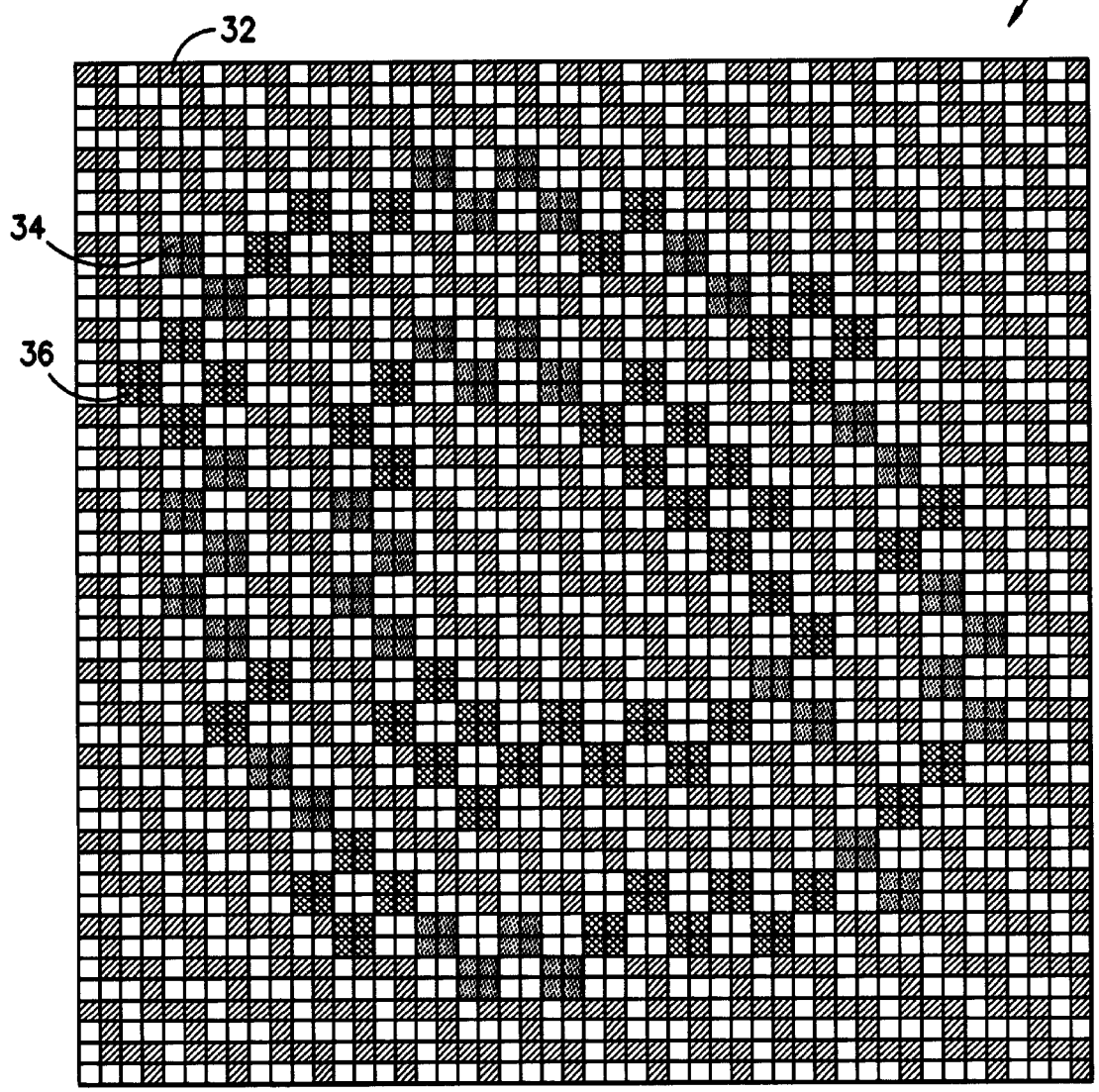
FIG. -2-

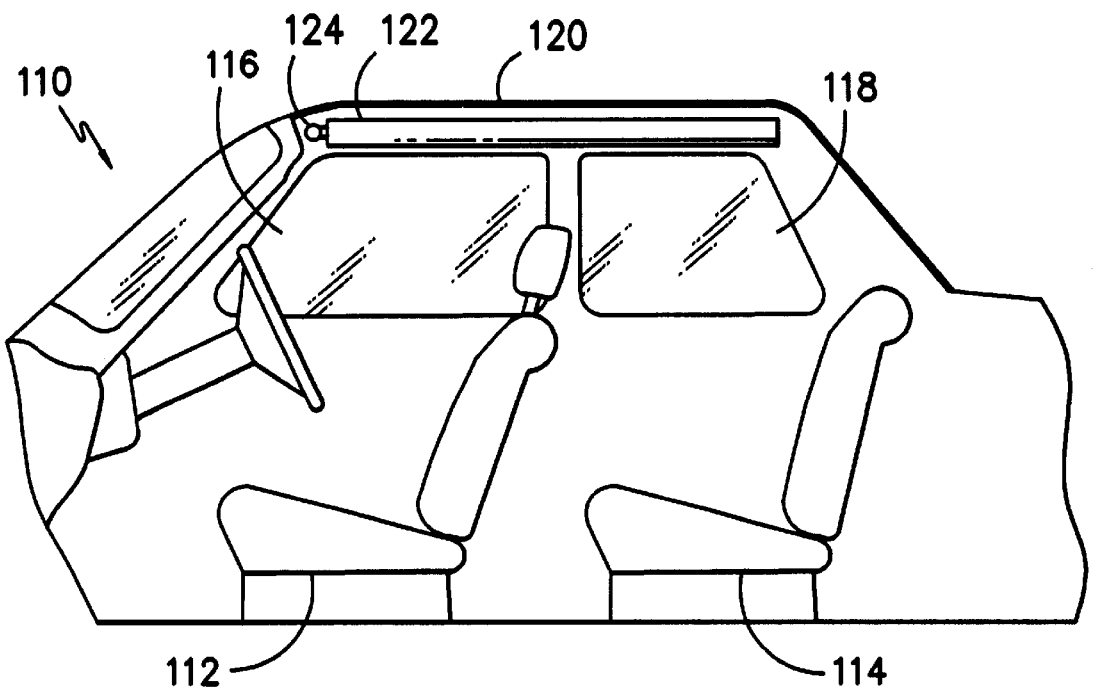
FIG. -3-
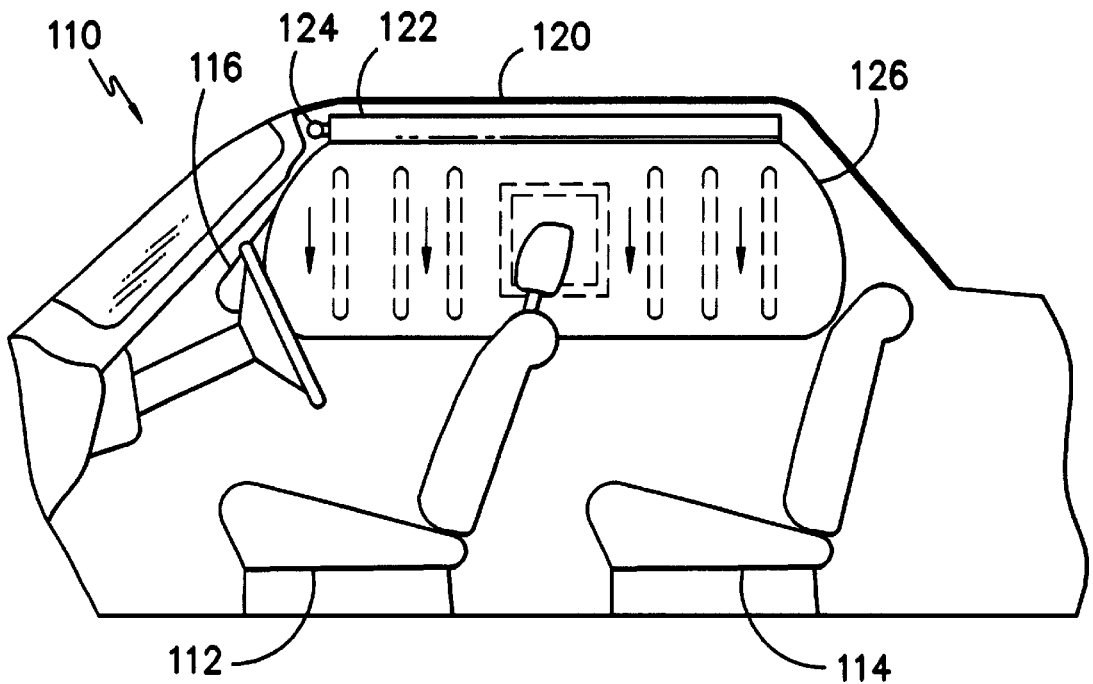
FIG. -4-

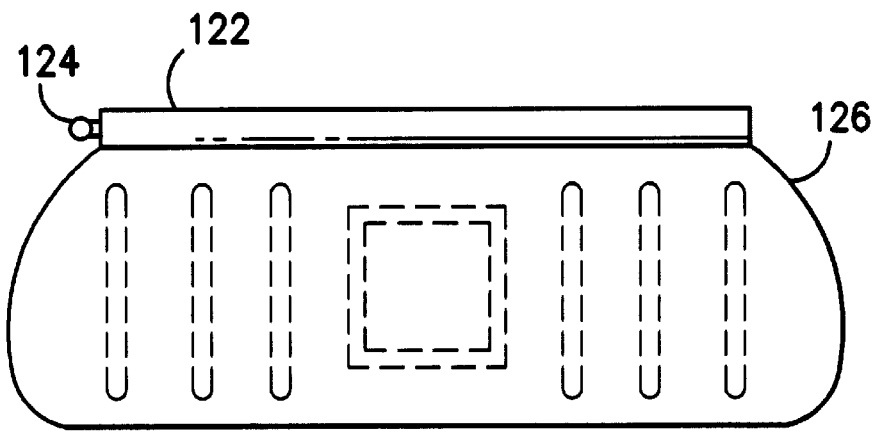
FIG. —5—
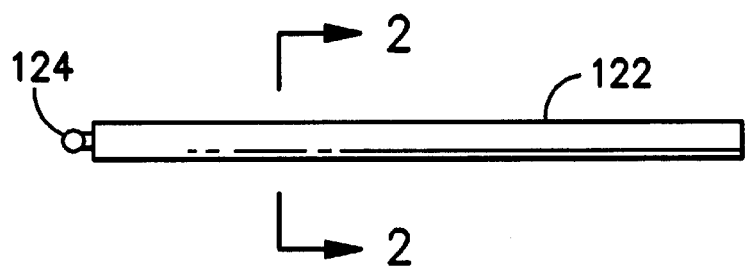
FIG. —6—
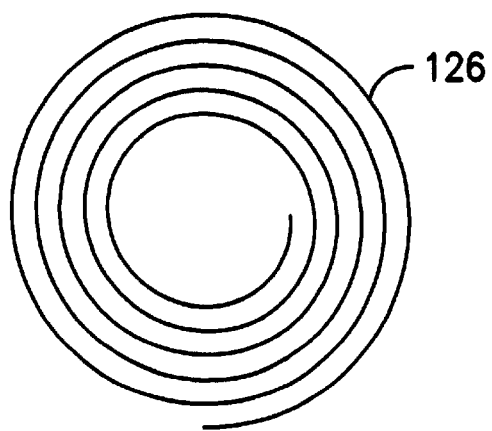
FIG. —7—

LOW PERMEABILITY AIRBAG CUSHIONS HAVING FILM COATINGS OF EXTREMELY LOW THICKNESS

CROSS REFERENCE TO RELATED APPLICATIONS

This application is a continuation-in-part of co-pending application Ser. No. 09/557,643, filed on Apr. 25, 2000, which is a continuation-in-part of co-pending application Ser. No. 09/501,467, filed on Feb. 9, 2000, which is a continuation-in-part of Ser. No. 09/350,620, filed on Jul. 9, 1999, now U.S. Pat. No. 6,177,366, which is a continuation-in-part of Ser. No. 09/335,257, filed on Jun. 17, 1999, now U.S. Pat. No. 6,177,365; this application is also a continuation-in-part of co-pending application Ser. No. 09/406,264, filed on Sep. 24, 1999, now U.S. Pat. No. 6,220,309. These parent applications are herein entirely incorporated by reference.

FIELD OF THE INVENTION

This invention relates generally to coated inflatable fabrics and more particularly concerns airbag cushions to which very low add-on amounts of coating have been applied and which exhibit extremely low air permeability. The inventive inflatable fabrics are primarily for use in automotive restraint cushions that require low permeability characteristics (such as side curtain airbags). Traditionally, heavy, and thus expensive, coatings of compounds such as neoprene, silicones and the like, have been utilized to provide such required low permeability. The inventive fabric utilizes an inexpensive, very thin coating to provide such necessarily low permeability levels. Thus, the inventive coated inflatable airbag comprises a film laminated on at least a portion of the target fabric surface wherein the film possesses a tensile strength of at least 2,000 and an elongation at break of at least 180%. The film provides a low permeability airbag cushion exhibiting a leak-down time of at least 5 seconds wherein the film is present on the surface in an amount of at most 3.0 ounces per square yard of the fabric.

BACKGROUND OF THE PRIOR ART

Airbags for motor vehicles are known and have been used for a substantial period of time. A typical construction material for airbags has been a polyester or nylon fabric, coated with an elastomer such as neoprene, or silicone. The fabric used in such bags is typically a woven fabric formed from synthetic yam by weaving practices that are well known in the art.

The coated material has found acceptance because it acts as an impermeable barrier to the inflation medium. This inflation medium is generally a nitrogen gas generated from a gas generator or inflator. Such gas is conveyed into the cushion at a relatively warm temperature. The coating obstructs the permeation of the fabric by such hot gas, thereby permitting the cushion to rapidly inflate without undue decompression during a collision event.

Airbags may also be formed from uncoated fabric which has been woven in a manner that creates a product possessing low permeability or from fabric that has undergone treatment such as calendaring to reduce permeability. Fabrics which reduce air permeability by calendaring or other mechanical treatments after weaving are disclosed in U.S. Pat. No. 4,921,735; U.S. Pat. No. 4,977,016; and U.S. Pat. No. 5,073,418 (all incorporated herein by reference).

Silicone coatings typically utilize either solvent based or complex two component reaction systems. Dry coating weights for silicone have been in the range of about 3 to 4 ounces per square yard or greater for both the front and back panels of side curtain airbags. As will be appreciated by one of ordinary skill in this art, high add on weights substantially increase the cost of the base fabric for the airbag and make packing within small airbag modules very difficult. Furthermore, silicone exhibits very low tensile strength and elongation at break characteristics which do not withstand high pressure inflation easily without the utilization of very thick coatings.

The use of certain polyurethanes as coatings as disclosed in U.S. Pat. No. 5,110,666 to Menzel et al. (herein incorporated by reference) permits low add on weights reported to be in the range of 0.1 to 1 ounces per square yard but the material itself is relatively expensive and is believed to require relatively complex compounding and application procedures due to the nature of the coating materials. Patentees, however, fails to disclose any pertinent elasticity and/or tensile strength characteristics of their particular polyurethane coating materials. Furthermore, there is no discussion pertaining to the importance of the coating ability (and thus correlated low air permeability) at low add-on weights of such polyurethane materials on side curtain airbags either only for fabrics which are utilized within driver or passenger side cushions. All airbags must be inflated extremely quickly; upon sensing a collision, in fact, airbags usually reach peak pressures within 10 to 20 milliseconds. Regular driver side and passenger side air bags are designed to withstand this enormous inflation pressure; however, they also deflate very quickly in order to effectively absorb the energy from the vehicle occupant hitting the bag. Such driver and passenger side cushions (airbags) are thus made from low permeability fabric, but they also deflate quickly at connecting seams (which are not coated to prevent air leakage) or through vent holes. Furthermore, the low add-on coatings taught within Menzel, and within U.S. Pat. No. 5,945,186 to Li et al., would not provide long-term gas retention; they would actually not withstand the prolonged and continuous pressures supplied by activated inflators for more than about 2 seconds, at the most. The low permeability of these airbag fabrics thus aid in providing a small degree of sustained gas retention within driver and passenger airbag cushions to provide the deflating cushioning effects necessary for sufficient collision protection. Such airbag fabrics would not function well with side curtain airbags, since, at the very least, the connecting seams which create the pillowed, cushioned structures within such airbags, as discussed in greater detail below, would not be coated. As these areas provide the greatest degree of leakage during and after inflation, the aforementioned patented low coating low permeability airbag fabrics would not be properly utilized within side curtain airbags.

As alluded to above, there are three primary types of different airbags, each for different end uses. For example, driver-side airbags are generally mounted within steering columns and exhibit relatively high air permeabilities in order to act more as a cushion for the driver upon impact. Passenger-side airbags also comprise relatively high air permeability fabrics which permit release of gas either therethrough or through vents integrated therein. Both of these types of airbags are designed to protect persons in sudden collisions and generally burst out of packing modules from either a steering column or dashboard (and thus have multiple "sides"). Side curtain airbags, however, have been designed primarily to protect passengers during rollover crashes by retaining its inflation state for a long duration and generally unroll from packing containers stored within the roofline along the side windows of an automobile (and thus have a back and front side only). Side curtain airbags therefore not only provide cushioning effects but also provide protection from broken glass and other debris. As such, it is imperative that side curtain airbags, as noted above, retain large amounts of gas, as well as high gas pressures, to remain inflated throughout the longer time periods of the entire potential rollover situation. To accomplish this, these side curtains are generally coated with very large amounts of sealing materials on both the front and back sides. Since most side curtain airbag fabrics comprise woven blanks that are either sewn, sealed, or integrally woven together, discrete areas of potentially high leakage of gas are prevalent, particularly at and around the seams. It has been accepted as a requirement that heavy coatings were necessary to provide the low permeability (and thus high leak-down time) necessary for side curtain airbags. Without such heavy coatings, such airbags would most likely deflate too quickly and thus would not function properly during a rollover collision. As will be well understood by one of ordinary skill in this art, such heavy coatings add great cost to the overall manufacture of the target side curtain airbags. There is thus a great need to manufacture low permeability side curtain airbags with less expensive (preferably lower coating add-on weight) coatings without losing the aging, humidity, and permeability characteristics necessary for proper functioning upon deployment. To date, there has been little accomplished, if anything at all, alleviating the need for such thick and heavy airbag coatings from side curtain airbags.

Furthermore, there is a current drive to store such low permeability side curtain airbags within cylindrically shaped modules. Since these airbags are generally stored within the rooflines of automobiles, and the area available is quite limited, there is always a great need to restrict the packing volume of such restraint cushions to their absolute minimum. However, the previously practiced low permeability side curtain airbags have proven to be very cumbersome to store in such cylindrically shaped containers at the target automobile's roofline. The actual time and energy required to roll such heavily coated low permeability articles as well as the packing volume itself, has been very difficult to reduce. Furthermore, with such heavy coatings utilized, the problems of blocking (i.e., adhering together of the different coated portions of the cushion) are amplified when such articles are so closely packed together. The chances of delayed unrolling during inflation are raised when the potential for blocking is present. Thus, a very closely packed, low packing volume, low blocking side curtain low permeability airbag is highly desirable. Unfortunately, the prior art has again not accorded such an advancement to the airbag industry.

OBJECTS AND BRIEF DESCRIPTION OF THE INVENTION

In light of the background above, it can be readily seen that there exists a need for a low permeability, side curtain airbag that utilizes lower, and thus less expensive, amounts of coating, and therefore exhibits a substantially reduced packing volume over the standard low permeability type side curtain airbags. Such a coated low permeability airbag must provide a necessarily high leak-down time upon inflation and after long-term storage. Such a novel airbag and a novel coating formulation provides marked improvements over the more expensive, much higher add-on airbag coatings (and resultant airbag articles) utilized in the past.

It is therefore an object of this invention to provide a coated airbag, wherein the coating is present in a very low add-on weight, possessing extremely high leak-down time characteristics after inflation and thus complementary low permeability characteristics. Another object of the invention is to provide an inexpensive side curtain airbag cushion. A further object of this invention is to provide an highly effective airbag coating formulation which may be applied in very low add-on amounts to obtain extremely low permeability airbag structures after inflation. An additional object of this invention is to provide an airbag coating formulation which not only provides beneficial and long-term low permeability, but also exhibits excellent long-term storage stability (through heat aging and humidity aging testing). Yet another object of the invention is to provide a low permeability side curtain airbag possessing a very low rolled packing volume and non-blocking characteristics for effective long-term storage within the roofline of an automobile.

Accordingly, this invention is directed to an airbag cushion comprising a coated fabric, wherein said fabric is laminated with a film, wherein said film is present in an amount of at most 3.0 ounces per square yard of the fabric; and wherein said airbag cushion, after long-term storage, exhibits a characteristic leak-down time of at least 5 seconds. Also, this invention concerns an airbag cushion comprising a coated fabric, wherein said fabric is coated with a laminate film; wherein said laminate film possesses a tensile strength of at least 2,000 and an elongation of at least 180%; and wherein said airbag cushion, after long-term storage, exhibits a characteristic leak-down time of at least 5 seconds. Additionally, this invention encompasses a coated airbag cushion which exhibits a rolled packing volume factor (measured as the quotient of the rolled diameter of the airbag cushion to the measured depth of coverage measured from the attachment point of the target automobile's roofline to lowest point of coverage below the roofline after inflation multiplied by the square root of the yarn diameter for the particular denier yarns constituting the airbag itself) of at most 1.20.

The term "characteristic leak-down time" is intended to encompass the measurement of time required for the entire amount of inflation gas introduced within an already-inflated (to a peak initial pressure which "opens" up the areas of weak sealing) and deflated airbag cushion upon subsequent re-inflation at a constant pressure at 10 psi. It is well known and well understood within the airbag art, and particularly concerning side curtain (low permeability) airbag cushions, that retention of inflation gas for long periods of time is of utmost importance during a collision. Side curtain airbags are designed to inflate as quickly as driver- and passenger-side bags, but they must deflate very slowly to protect the occupants during roll over and side impact. Thus, it is imperative that the bag exhibits a very low leakage rate after the bag experiences peak pressure during the instantaneous, quick inflation. Hence, the coating on the bag must be strong enough to withstand the shock and stresses when the bag is inflated so quickly. Thus, a high characteristic leak-down rate measurement is paramount in order to retain the maximum amount of beneficial cushioning gas within the inflated airbag. Airbag leakage after inflation (and after peak pressure is reached) is therefore closely related to actual pressure retention characteristics. The pressure retention characteristics (hereinafter referred to as "leak-down time") of already-inflated and deflated side curtain airbags can be described by a characteristic leak-down rate t, wherein:

$$t(\text{second}) = \frac{\text{Bag volume (ft}^3)}{\text{Volumetric leakage rate (}SCFH^*\text{) at 10 }Psi} \times 3600$$

*SCFH: standard cubic feet per hour.

It is understood that the 10 psi constant is not a limitation to the invention; but merely the constant pressure at which the leak-down rate measurements are made. Thus, even if the pressure is above or below this amount during actual inflation or after initial pressurizing of the airbag, the only limitation is that if one of ordinary skill in the art were to measure the bag volume and divide that by the volumetric leakage rate (measured by the amount leaking out of the target airbag during steady state inflation at 10 psi), the resultant measurement in time would be at least 5 seconds. Preferably, this time is greater than about 9 seconds; more preferably, greater than about 15 seconds; and most preferably, greater than about 20 seconds.

Alternatively, and in a manner of measurement with uninflated side curtain airbags, the term "leak-down time" may be measured as the amount of time required for at half of the introduced inflation gas to escape from the target airbag after initial peak pressure is reached. Thus, this measurement begins the instant after peak initial pressure is reached upon inflation (such as, traditionally, about 30 psi) with a standard inflation module which continues to pump gas into the target airbag during and after peak initial pressure is reached. It is well understood that the pressure of gas forced into the airbag after peak initial pressure is reached will not remain stable (it decreases during the subsequent introduction of inflation gas), and that the target airbag will inevitably permit escape of a certain amount of inflation gas during that time. The primary focus of such side curtain airbags (as noted above) is to remain inflated for as long as possible in order to provide sufficient cushioning protection to vehicle occupants during rollover accidents. The greater amount of gas retained, the better cushioning effects are provided the passengers. Thus, the longer the airbag retains a large amount of inflation gas, and consequently the greater the characteristic leak-down time, the better cushioning results are achieved. At the very least, the inventive airbag must retain at least half of its inflated gas volume 5 seconds subsequent to reaching peak initial pressure. Preferably, this time is 9 seconds, more preferably 15 seconds, and most preferably 20 seconds.

Likewise, the term, "after long-term storage" encompasses either the actual storage of an inventive airbag cushion within an inflator assembly (module) within an automobile, and/or in a storage facility awaiting installation. Such a measurement is generally accepted, and is well understood and appreciated by the ordinarily skilled artisan, to be made through comparable analysis after representative heat and humidity aging tests. These tests generally involve 107° C. oven aging for 16 days, followed by 83° C. and 95% relative humidity aging for 16 days and are universally accepted as proper estimations of the conditions of long-term storage for airbag cushions. Thus, this term encompasses such measurement tests. The inventive airbag fabrics must exhibit proper characteristic leak-down times after undergoing such rigorous pseudo-storage testing.

The inventive coating, here a film, must possess a tensile strength of at least 2,000 psi and an elongation to break of greater than about 180%. Preferably, the tensile strength is at least 3,000 psi, more preferably, 6,000, and most preferably at least about 8,000 (the high end is basically the highest one can produce which can still adhere to a fabric surface). The preferred elongation to break is more than about 200%, more preferably more than about 300%, and most preferably more than about 600%. These characteristics of the film translate to a coating that is both very strong (and thus will withstand enormous pressures both at inflation and during the time after inflation and will not easily break) and can stretch to compensate for such large inflation, etc., pressures. The film itself is produced prior to actual contact with the target airbag cushion, or fabric, surface. In order to apply such a film, a lamination procedure must be performed through the simultaneous exposure of heat and pressure over the film while in contact with the target surface. The laminate may be applied over any portion of the target structure, although preferably it coats the entire cushion or fabric. Also, more than one laminated film may be present on the target cushion as one type of film (possessing certain tensile strength and elongation characteristics) may be preferably applied to certain discrete areas of the target cushion while a different film with different characteristics may be selected at other locations (such as at the seams). The only requirement is that the final product exhibit the aforementioned high leak-down properties. This film appears to act by "cementing" the contacted individual yams in place and possibly preventing leakage through open areas between woven yams and/or stitches. During inflation, then, the coating prevents leakage through the interstitial spaces between the yams and aids in preventing yam shifting (which may create larger spaces for possible gas escape).

The utilization of such high tensile strength and high elongation at break components permits the consequent utilization, surprisingly, of extremely low add-on weight amounts of such films. Normally, the required coatings (which are not films, but actual coating formulations applied to the surface which then may form non-laminated films) on side curtain airbags are very high, at least 3.5 ounces per square yard (with the standard actually much higher than that, at about 4.0). The inventive airbag cushions require merely about 2.7 ounces per square yard of the desired film coating (preferably less, such as about 2.5, more preferably about 2.2, still more preferably, less than 2.2) ounces per square yard of this inventive coating to effectuate the desired high leak-down (low permeability). Furthermore, the past coatings were required to exhibit excellent heat and humidity aging stability. Unexpectedly, even at such low add-on amounts, and particularly with historically questionable coating materials (polyurethanes, for example), the inventive coatings, and consequently, the inventive coated airbag cushions, exhibit excellent heat aging and humidity aging characteristics. Thus, the coating compositions and coated airbags are clearly improvements within this specific airbag art.

Of particular interest as the desired films are polyurethanes, although any film which possesses the same desired tensile strength and elongation characteristics noted above may function within this inventive low permeability airbag cushion. Copolymers of polyurethanes, polyamides, and the like, may be utilized, as merely one type of example. Also, such films may or may not be cross-linked on the airbag surface. Preferably, the film is a polyurethane and most preferably is a polycarbonate polyurethane or a polyurethane film based on polytetramethylene glycol diol (available from Deerfield Urethane, Inc., Ivyland, Pa., under the tradename Dureflex™ PT9400). This specific film exhibits a tensile strength of 8,000 psi and an elongation at break of about 600%. Such a film may be added in an amount of as low as 2.2 ounces per square yard on the desired cushion and still provide the requisite high leak-down time characteristics. Of course, any other film meeting the characteristics as noted above is encompassed within this invention; however, the add-on weights of other available films may be greater than this preferred one, depending on the actual tensile strength and elongation properties available. However, the upper limit of 3.0 ounces per square yard should not be exceeded to meet this invention. The desired films may be added in multiple layers if desired as long the required thickness for the overall coating is not exceeded. Alternatively, the multiple layer film/coating system may also be utilized as long as at least one film possessing the desired tensile strength and elongation at break is utilized and the requisite low permeability is exhibited.

Other possible components present within or on these films are thickeners, antioxidants, flame retardants, coalescent agents, adhesion promoters, and colorants. In accordance with the potentially preferred practices of the present invention, a primer adhesive coating is first applied to the target cushion surface or to the laminate film as a tie-coat to enhance the adhesion between the laminate film and the fabric cushion. Upon drying of this first layer, the desired film is then laminated through heat and pressure to the selected areas of the target surface for a sufficient time to effectuate lamination. Preferably, the preferred film (or films) will not include any silicone, due to the extremely low tensile strength (typically below about 1,500 psi) characteristics exhibited by such materials. However, in order to provide effective aging and non-blocking benefits, such components may be applied to the film as a topcoat as long as the add-on weight of the entire film and topcoat does not exceed 3.0 ounces per square yard. Additionally, elastomers comprising polyester or polyether segments or other similar components, are undesirable, particularly at very low add-on weights (i.e., 0.8–1.2 $oz/yd^2$) due to stability problems in heat and humidity aging polyesters easily hydrolyze in humidity and polyethers easily oxidize in heat); however, such elastomers may be utilized in topcoat formulations as long, again, as the 3.0 ounces per square yard is not exceeded.

Among the other additives particularly preferred within or on the film (or films) are heat stabilizers, flame retardants, primer adhesives, and materials for protective topcoats. A potentially preferred thickener is marketed under the trade designation NATROSOL™ 250 HHXR by the Aqualon division of Hercules Corporation which is believed to have a place of business at Wilmington, Del. In order to meet Federal Motor Vehicle Safety Standard 302 flame retardant requirements for the automotive industry, a flame retardant is also preferably added to the compounded mix. One potentially preferred flame retardant is AMSPERSE F/R 51 marketed by Amspec Chemical Corporation which is believed to have a place of business at Gloucester City N.J. As noted above, primer adhesives may be utilized to facilitate adhesion between the surface of the target fabric and the film itself. Thus, although it is preferable for the film to be the sole component of the entire coating in contact with the fabric surface, it is possible to utilize adhesion promoters, such as isocyanates, epoxies, functional silanes, and other such resins with adhesive properties, without deleteriously effecting the ability of the film to provide the desired low permeability for the target airbag cushion. A topcoat component, as with potential silicones, as noted above, may also be utilized to effectuate proper non-blocking characteristics to the target airbag cushion. Such a topcoat may perform various functions, including, but not limited to, improving aging of the film (such as with silicone) or providing blocking resistance due to the adhesive nature of the coating materials (most noticeably with the preferred polyurethane polycarbonates).

Airbag fabrics must pass certain tests in order to be utilized within restraint systems. One such test is called a blocking test which indicates the force required to separate two portions of coated fabric from one another after prolonged storage in contact with each other (such as an airbag is stored). Laboratory analysis for blocking entails pressing together coated sides of two 2 inch by 2 inch swatches of airbag fabric at 5 psi at 100° C. for 7 days. If the force required to pull the two swatches apart after this time is greater than 50 grams, or the time required to separate the fabrics utilizing a 50 gram weight suspended from the bottom fabric layer is greater than 10 seconds, the coating fails the blocking test. Clearly, the lower the required separating shear force, the more favorable the coating. For improved blocking resistance (and thus the reduced chance of improper adhesion between the packed fabric portions), topcoat components may be utilized, such as talc, silica, silicate clays, and starch powders, as long as the add-on weight of the entire elastomer composition (including the topcoat) does not exceed 3.0 ounces per square yard (and preferably exists at a much lower level, about 1.5, for instance).

Two other tests which the specific coated airbag cushion must pass are the oven (heat) aging and humidity aging tests. Such tests also simulate the storage of an airbag fabric over a long period of time upon exposure at high temperatures and at relatively high humidities. These tests are actually used to analyze alterations of various different fabric properties after such a prolonged storage in a hot ventilated oven (>100° C.) (with or without humid conditions) for 2 or more weeks. For the purposes of this invention, this test was used basically to analyze the air permeability of the coated side curtain airbag by measuring the characteristic leak-down time (as discussed above, in detail). The initially produced and stored inventive airbag cushion should exhibit a characteristic leak-down time of greater than about 5 seconds (upon re-inflation at 10 psi gas pressure after the bag had previously been inflated to a peak pressure above about 15 psi and allowed to fully deflate) under such harsh storage conditions. Since polyurethanes, the preferred elastomers in this invention, may be deleteriously affected by high heat and humidity (though not as deleteriously as certain polyester and polyether-containing elastomers), it may be prudent to add certain components within a topcoat layer and/or within the elastomer itself. Antioxidants, antidegradants, and metal deactivators may be utilized for this purpose. Examples include, and are not intended to be limited to, Irganox® 1010 and Irganox® 565, both available from CIBA Specialty Chemicals. This topcoat may also provide additional protection against aging and thus may include topcoat aging improvement materials, such as, and not limited to, polyamides, NBR rubbers, EPDM rubbers, and the like, as long as the elastomer composition (including the topcoat) does not exceed the 3.0 ounces per square yard (preferably much less than that, about 1.5 at the most) of the add-on weight to the target fabric.

The substrate to which the thin film coatings are applied to form the airbag base fabric in accordance with the present invention is preferably a woven fabric formed from yarns comprising synthetic fibers, such as polyamides or polyesters. Such yarn preferably has a linear density of about 105 denier to about 840 denier, more preferably from about 210 to about 630 denier. Such yarns are preferably formed from multiple filaments wherein the filaments have linear densities of about 7 denier per filaments or less, more preferably about 6 dpf or less, and most preferably about 4 dpf or less. In the more preferred embodiment such substrate fabric will be formed from fibers of nylon, and most preferred is nylon 6,6. It has been found that such polyamide materials exhibit particularly good adhesion and maintenance of resistance to hydrolysis when used in combination with the coating according to the present invention. Such substrate fabrics are preferably woven using fluid jet weaving machines as disclosed in U.S. Pat. Nos. 5,503,197 and 5,421,378 to Bower et al. (incorporated herein by reference). Such woven fabric will be hereinafter referred to as an airbag base fabric. As noted above, the inventive airbag must exhibit extremely low permeability and thus must be what is termed a "side curtain" airbag. As noted previously and extensively, such side curtain airbags (a.k.a., cushions) must retain a large amount of inflation gas during a collision in order to accord proper long-duration cushioning protection to passengers during rollover accidents. Any standard side curtain airbag may be utilized in combination with the low add-on coating to provide a product which exhibits the desired leak-down times as noted above. Most side curtain airbags are produced through labor-intensive sewing or stitching (or other manner) together two separate woven fabric blanks to form an inflatable structure. Furthermore, as is well understood by the ordinarily skilled artisan, such sewing, etc., is performed in strategic locations to form seams (connection points between fabric layers) which in turn produce discrete open areas into which inflation gasses may flow during inflation. Such open areas thus produce pillowed structures within the final inflated airbag cushion to provide more surface area during a collision, as well as provide strength to the bag itself in order to withstand the very high initial inflation pressures (and thus not explode during such an inflation event). Other side curtain airbag cushions exist which are of the one-piece woven variety. Basically, some inflatable airbags are produced through the simultaneous weaving of two separate layers of fabric which are joined together at certain strategic locations (again, to form the desired pillowed structures). Such cushions thus present seams of connection between the two layers. It is the presence of so many seams (in both multiple-piece and one-piece woven bags) which create the aforementioned problems of gas loss during and after inflation. The possibility of yarn shifting, particularly where the yarns shift in and at many different ways and amounts, thus creates the quick deflation of the bag through quick escaping of inflation gasses. Thus, the base airbag fabrics do not provide much help in reducing permeability (and correlated leak-down times, particularly at relatively high pressures). It is this seam problem which has primarily created the need for the utilization of very thick, and thus expensive, coatings to provide necessarily low permeability in the past.

Recently, a move has been made away from both the multiple-piece side curtain airbags (which require great amounts of labor-intensive sewing to attached woven fabric blanks) and the traditionally produced one-piece woven cushions, to more specific one-piece woven fabrics which exhibit substantially reduced floats between woven yarns to substantially reduce the unbalanced shifting of yarns upon inflation, such as in Ser. Nos. 09/406,264 and 09/668,857, both to Sollars, Jr., the specifications of which are completely incorporated herein and described in greater depth hereafter:

The term "inflatable fabric" hereinafter is intended to encompass any fabric which is constructed of at least two layers of fabric which can be sealed to form a bag article. The inventive inflatable fabric thus must include double layers of fabric to permit such inflation, as well as single layers of fabric either to act as a seal at the ends of such fabric panels, or to provide "pillowed" chambers within the target fabric upon inflation. The term "all-woven" as it pertains to the inventive fabric thus requires that the inflatable fabric having double and single layers of fabric be produced solely upon a loom. Any type of loom may be utilized for this purpose, such as water-jet, air-jet, rapier, and the like. Patterning may be performed utilizing Jacquard weaving and/or dobby weaving, particularly on fluid-jet and/or high speed rapier loom types.

The constructed fabric may exhibit balanced or unbalanced pick/end counts; the main requirement in the woven construction is that the single layer areas of the inflatable fabric exhibit solely basket-weave patterns. These patterns are made through the arrangement of at least one warp yarn (or weft yarn) configured around the same side of two adjacent weft yarns (or warp yarns) within the weave pattern. The resultant pattern appears as a "basket" upon the arrangement of the same warp (or weft) yarn to the opposite side of the next adjacent weft (or warp) yarn. Such basket weave patterns may include the arrangement of a warp (or weft) yarn around the same side of any even number of weft (or warp) yarns, preferably up to about six at any one time, most preferably up to about 4.

The sole utilization of such basket weave patterns in the single layer zones provides a number of heretofore unexplored benefits within inflatable fabric structures. For example, such basket weave patterns permit a constant "seam" width and weave construction over an entire single layer area, even where the area is curved. As noted above, the standard Oxford weaves currently utilized cannot remain as the same weave pattern around curved seams; they become plain weave patterns. Also, such basket weave seam patterns permit the construction of an inflatable fabric having only plain woven double layer fabric areas and single layer "seams" with no "floats" of greater than three picks within the entire fabric structure. Such a fabric would thus not possess discrete locations where the air permeability is substantially greater than the remaining portions of the fabric. Additionally, such a weave structure permits the utilization of as low as two different weave densities (patterns, etc.) in the area of the produced seam. Thus, the seam itself is of one weave pattern and the weave pattern in the area directly adjacent to the seam is another weave pattern. No other patterns are utilized in that specific seam area. By directly adjacent, it is intended that such a described area is within at most 14 yarn-widths, preferably as low as 2 yarn-widths, and most preferably between about 4 and 8 yarn-widths, from the actual seam itself. Such a limitation on different weave densities has never been accomplished in all-woven airbags in the past.

Generally, the prior art (such as Thornton et al., supra) provides seam attachments exhibited at least three different weave densities within the directly adjacent area of the seams themselves. Furthermore, the prior art weaving procedures produce floats of sometimes as much as six or seven picks at a time. Although available software to the weaving industry permits "filling in" of such floats within weave diagrams, such a procedure takes time and still does not continuously provide a fabric exhibiting substantially balanced air permeability characteristics over the entire structure. The basket-weave formations within the single fabric layers thus must be positioned in the fabric so as to prevent irregularities (large numbers of floats, for example) in the weave construction at the interface between the single and double fabric layers (as described in FIG. 2, below). Another benefit such basket weave patterns accord the user is the ability to produce more than one area of single layer fabric (i.e., another "seam" within the fabric) adjacent to the first "seam." Such a second seam provides a manner of dissipating the pressure from or transferring the load upon each individual yarn within both seams. Such a benefit thus reduces the chances of deleterious yarn shifting during an inflation event through the utilization of strictly a woven fabric construction (i.e., not necessarily relying upon the utilization of a coating as well). The previously disclosed or utilized inflatable fabrics having both double and single fabric layer areas have not explored such a possibility in utilizing two basket-weave pattern seams. Furthermore, such a two-seam construction eliminates the need for weaving a large single fabric layer area within the target inflatable fabric. The prior art fabrics which produce "pillowed" chambers for airbag cushions (such as side curtains), have been formed through the weaving of entire areas of single fabric layers (which are not actually seams themselves). Such a procedure is time-consuming and rather difficult to perform. The inventive inflatable fabric merely requires, within this alternative embodiment, at least two very narrow single fabric layer areas (seams) woven into the fabric structure (another preferred embodiment utilizes merely one seam of single layer fabric); the remainder of the fabric located within these two areas may be double layer if desired. Thus, the inventive fabric permits an improved, cost-effective, method of making a "pillowed" inflatable fabric.

The inflatable fabric itself, as noted above, is preferably produced from all-synthetic fibers, such as polyesters and polyamides, although natural fibers may also be utilized in certain circumstances. Preferably, the fabric is constructed of nylon-6,6, however, polyesters are also highly preferred. Mixtures of such fibers are also possible. The individual yarns utilized within the fabric substrate must generally possess deniers within the range of from about 40 to about 840; preferably from about 100 to about 630. Most preferably, such deniers average over the entire airbag fabric structure at most 525; more preferably average at most 420; and also preferably average 315 and even as low as 210, if desired. In such instances of such low average deniers (420 and below), the thickness of the fabric structure itself is quite low and thus, with the inventive coating applied at low add-on levels, exhibits excellent low packing volumes.

Furthermore, although it is not preferred in this invention, it has been found that the inventive coating composition provides similar low permeability benefits to standard one-piece woven airbags, particularly with the inventive low add-on amounts of high tensile strength, high elongation, non-silicone coatings; however, the amount of coating required to permit high leak-down times is much higher than for the aforementioned inventive one-piece woven structure. Thus, add-on amounts of as much as 1.5 and even up to about 3.0 ounces per square yard may be necessary to effectuate the proper low level of air permeability for these other one-piece woven airbags. Even with such higher add-on coatings, the inventive coatings themselves clearly provide a marked improvement over the standard, commercial, prior art silicone, etc., coatings (which must be present in amounts of at least 3.0 ounces per square yard).

Additionally, it has also been found that the inventive film coating compositions, at the inventive add-on amounts, etc., provide the same types of benefits with the aforementioned sewn, stitched, etc., side curtain airbags. Although such structures are highly undesirable due to the high potential for leakage at these attachment seams, it has been found that the inventive coating provides a substantial reduction in permeability (to acceptable leak-down time levels, in fact) with correlative lower add-on amounts than with standard silicone and neoprene rubber coating formulations. Such add-on amounts will approach the 2.7 ounces per square yard limit, but lower amounts have proven effective (2.2 ounces per square yard, for example) depending on the utilization of a sufficiently high tensile strength and sufficiently stretchable elastomeric component within the film coating composition directly in contact with the target fabric surface. Again, with the ability to reduce the amount of coating materials (which are generally always quite expensive), while simultaneously providing a substantial reduction in permeability to the target airbag structure, as well as high resistance to humidity and extremely effective aging stability, the inventive coating composition, and the inventive coated airbag itself is clearly a vast improvement over the prior airbag coating art.

Of particular importance within this invention, is the ability to pack the laminated airbag cushions within storage containers at the roof line of a target automobile in as small a volume as possible, such as within cylindrically or polygonally shaped modules. In a rolled, accordion-style, Z-folded (or any other) configuration (in order to best fit within the storage module itself, and thus in order to best inflate upon a collision event downward to accord the passengers sufficient protection), the inventive airbag may be constricted to a stored shape of as low volume as possible. It has been found that the best, though not the only, test of determining the effective low volume exhibited by a non-inflated side curtain airbag is to roll any bag lengthwise until it is substantially cylindrical in shape. In such a shape, it is preferable that the target side curtain airbag have a diameter of at most 23 millimeters. The term "diameter" is intended to encompass any cross-section of the inflatable fabric in its rolled storage configuration such that the length of the stored fabric is the same as the length of the inflated fabric, and measuring the greatest distance between opposite points on such a cross-sectional area. It should and would be well understood by one of ordinary skill in this particular art that the actual side curtain measured does not have to be stored in such a specific rolled manner in practice, only that, in order to assess the rolled packing volume in terms of diameter compared with depth, the target side curtain should be first laid flat and then rolled into a substantially cylindrical shape with the subsequent measurement of diameter then taken.

Thus, in one non-limiting example, a 2 meter long cylindrical roofline storage container, the necessary volume of such a container would equal about 830 $cm^3$.(with the volume calculated as 2[Pi]radius$^2$) Standard rolled packing diameters are at least 25 millimeters for commercially available side curtain airbag cushions (due to the thickness of the required coating to provide low permeability characteristics). Thus, the required cylindrical container volume would be at least 980 $cm^3$. Preferably, the rolled diameter of the inventive airbag cushion during storage is at most 20 millimeters (giving a packed volume of about 628 $cm^3$)(and up to 23 millimeters and as low as possible, for example, about 16 millimeters) which is clearly well below the standard packing volume. Of course, the ability to provide very low packing volumes in directly related to the thickness of coating applied to the airbag itself, as well as, possibly, the denier fibers utilized to produce the bag itself. The lower the denier, the thinner the bag construction, and thus, the potential for lower packing volumes. In relation, then, to the depth of the airbag cushion upon inflation (i.e., the length the airbag extends from the roofline down to its lowest point along the side of the target automobile, such as at the windows), a packing volume equal to the quotient of the particular bag's packed diameter (again in its rolled state although any other packing configuration, such as "accordion-style," "Z-fold, and the like, may be utilized as well as rolling in actual practice) divided by inventive airbag cushion's depth (which is often, though not required to be measured, at approximately 17 inches or 431.8 millimeters) should be at most 0.05. Preferably this factor should be at most 0.486 (21 millimeter diameter), more preferably at most about 0.0463 (20 millimeters) or 0.044 (19 mm), or 0.0417 (18 mm), or 0.0394 (17 millimeters). Most preferably, the denier fibers utilized are about 420 on average and thus with a coating add-on amount of about 0.8 ounces/square yard provides a packing diameter of about 18 millimeters (and thus a packing volume factor of about 0.0417).

The prior art, having extremely thick coatings with relatively high denier fibers (420 and higher) provides, at best, a packing diameter of about 24 millimeters which thus provides (with a coating in excess of 4.0 ounces per square yard, generally) a packing volume factor of about 0.0556, well above the 0.05 limit taught above. As discussed above, with lower average denier fibers utilized within the subject side curtain airbag, the packing volume may be reduced. Such as within the scope of this invention as the primary, though not only, aim of reducing such packing volume is to provide an highly effective (i.e., very low permeability), low add-on film laminate to the target side curtain airbag. Of course, the aforementioned range of factors does not require the airbag depth to be at a standard of 17 inches, and is primarily a function of film thickness, and thus add-on weight, as well as yarn denier. As should be evident, however, longer (deeper) bags would require greater diameters in packing within a cylindrical storage capsule.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

DETAILED DESCRIPTION OF THE PREFERRED EMBODIMENT OF THE INVENTION

Surprisingly, it has been discovered that any film with a tensile strength of at least 2,000 psi and an elongation at break of at least 180% coated onto and over both sides of a side curtain airbag fabric surface at a weight of at most 3.0 ounces per square yard, and preferably below about 2.5, more about 2.2, and most preferably less than about 2.2 ounces per square yard, provides a coated airbag cushion which exhibits extremely low and extended permeability upon and after inflation. This unexpectedly beneficial type and amount of film coating thus provides an airbag cushion which will easily inflate after prolonged storage and will remain inflated for a sufficient amount of time to ensure an optimum level of safety within a restraint system. Furthermore, it goes without saying that the less film coating composition required, the less expensive the final product. Additionally, a lower required amount of film coating composition will translate into a decrease in the packing volume of the airbag fabric within an airbag device. This benefit thus improves the packability for the airbag fabric.

The preferred airbag cushion of this invention was produced in accordance with the following Example:

EXAMPLE

First, the preferred primer formulation was produced having the composition:

| Component | Parts by weight |
| --- | --- |
| Desmoderm ® 43195 (Bayer Corporation, polyurethane resin) | 25 grams |
| Dimethylformamide (Aldrich, solvent) | 75 grams |
| Desmodur ® CB-75N (Bayer, polyisocyanate adhesion promoter) | 4 grams |

This formulation was applied to both sides of a 2.5 liter size Jacquard woven nylon airbag (of 440 denier fibers), made in accordance with FIGS. 1 and 2, below. The primer was dried at about 160° C. for about 2 minutes to obtain a dry coating weight of about 0.25 ounces per square yard on each side. Subsequently, a 2 mil thick polyurethane film (Dureflex™ PT9400) was then laminated on both sides of the primer coated airbag utilizing a hotpress providing about 80 psi pressure at about 188° C. with a residence time of about 1 minute. The total polyurethane film add-on weight on each side of the airbag was about 2.2 ounces per square yard. The airbag was then rapidly inflated to 30 psi air pressure. More than 28 seconds elapsed before the air pressure leaked down to 8 psi. The leakage rate was thus measured at 10 psi to be about 4 SCFH. The characteristic leak-down time was an astounding amount, greater than 80 seconds.

DESCRIPTION OF THE DRAWINGS

FIG. 1 is a cross-sectional view of an inventive all-woven inflatable fabric showing the preferred double and single layer areas including two separate single layer areas.

FIG. 2 is a weave diagram illustrating a potentially preferred repeating pick pattern formed using repeating plain weave and basket weave four-pick arrangements.

FIG. 3 depicts the side, inside view of a vehicle prior to deployment of the inventive side curtain airbag.

FIG. 4 depicts the side, inside view of a vehicle after deployment of the inventive side curtain airbag.

FIG. 5 depicts a side view of a side curtain airbag.

FIG. 6 provides a side view of a side curtain airbag container.

FIG. 7 provides a cross-sectional perspective of the rolled airbag to test for the packing volume factor.

DETAILED DESCRIPTION OF THE DRAWINGS

Turning now to the drawings, in FIG. 1 there is shown a cross-section of a preferred structure for the double fabric layers 12, 14, 18, 20, 24, 26 and single fabric layers 16, 22 of the inventive inflatable fabric 10. Weft yarns 28 (exhibiting preferably deniers of about 420 each) are present in each of these fabric layer areas 12, 14, 16, 18, 20, 22, 24, 26 over and under which individual warp yarns 38, 40, 42, 44 (also exhibiting a preferred denier of 420) have been woven. The double fabric layers 12, 14, 18, 20, 24, 26 are woven in plain weave patterns. The single fabric layers 16, 22 are woven in basket weave patterns. Four weft yarns each are configured through each repeating basket weave pattern within this preferred structure; however, anywhere from two to twelve weft yarns may be utilized within these single fabric layer areas (seams) 16, 22. The intermediate double fabric layer areas 18, 20 comprise each only four weft yarns 28 within plain weave patterns. The number of such intermediate weft yarns 28 between the single fabric layer areas 16, 22 must be in multiples of two to provide the maximum pressure bearing benefits within the two seams 16, 22 and thus the lowest possibility of yarn shifting during inflation at the interfaces of the seams 16, 22 with the double fabric layer areas 12, 14, 24, 26.

FIG. 2 shows the weave diagram 30 for an inventive fabric which comprises two irregularly shapes concentric circles as the seams. Such a diagram also provides a general explanation as to the necessary selection criteria of placement of basket-weave patterns within the fabric itself. Three different types of patterns are noted on the diagram by different shades. The first 32 indicates the repeated plain weave pattern throughout the double fabric layers (12, 14, 18, 20, 24, 26 of FIG. 1, for example) which must always initiate at a location in the warp direction of 4X+1, with X representing the number of pick arrangement within the diagram, and at a location in the fill direction of 4X+1 (thus, the pick arrangement including the specific two-layer plain-weave-signifying-block 32 begins at the block four spaces below it in both directions). The second 34 indicates an "up-down" basket weave pattern wherein an empty block must exist and always initiate the basket-weave pattern at a location in the warp direction of 4X+1, with X representing the number of repeating pick arrangements within the diagram, and at a location in the fill direction of 4X+1, when a seam (such as 16 and 22 in FIG. 1) is desired (thus, the pattern including the pertinent signifying "up-down" block 34 includes an empty block within the basket-weave pick arrangement in both the warp and fill directions four spaces below it). The remaining pattern, which is basically a "down-up" basket weave pattern to a single fabric layer (such as 16 and 22 in FIG. 1) is indicated by a specifically shaded block 36. Such a pattern must always initiate at a location in the warp direction of 4X+1 and fill of 4X+3, or warp of 4X+3 and fill of 4X+1, when a seam is desired. Such a specific arrangement of differing "up-down" basket weave 34 and "down-up" basket weave 36 pattern is necessary to effectuate the continuous and repeated weave construction wherein no more than three floats (i.e., empty blocks) are present simultaneously within the target fabric structure. Furthermore, again, it is believed that there has been no such disclosure or exploration of such a concept within the inflatable fabric art.

As depicted in FIG. 3, an interior of a vehicle 110 prior to inflation of a side curtain airbag (not illustrated) is shown. The vehicle 110 includes a front seat 112 and a back seat 114, a front side window 116 and a back-side window 118, a roofline 120, within which is stored a cylindrically shaped container 122 comprising the inventive side curtain airbag (not illustrated). Also present within the roofline 120 is an inflator assembly 124 which ignites and forces gas into the side curtain airbag (126 of FIG. 4) upon a collision event.

FIG. 4 shows the inflated side curtain airbag 126. As noted above, the airbag 126 is laminated with at most 2.7 ounces per square of a coating formulation (not illustrated), preferably the polyurethane film formulation of the EXAMPLE above. The inventive airbag 126 will remain sufficiently inflated for at least 5 seconds, and preferably more, as high as at least 20 seconds, most preferably.

FIG. 5 shows the side curtain airbag 126 prior to storage in its uninflated state within the roofline cylindrically shaped container 122. The thickness of the airbag 126, measured as the rolled packing diameter (as in FIG. 7, below) as compared with the depth of the airbag measured from the roofline cylindrically shaped container 122 to the bottom most point 128 of the airbag 126 either in its uninflated or inflated state and multiplied by the square root of the 420 denier yarn diameter will be at least about 1.004. Larger factors are possible with higher add-on coating weights and larger yarns. Smaller yarns may be utilized with lower or larger add-on coating weights as well.

FIGS. 6 and 7 aid in understanding this concept through the viewing of the rolled airbag 126 as stored within the container 122 along line 2. The diameter measurement of the airbag 126 of Example 3, above, is roughly 20 millimeters. The standard depth of side curtain airbags is roughly 17 inches, or about 431.8 millimeters. Thus, the preferred packing volume factor is about 0.046 (20 mm/431.8 mm). A comparative silicone-based thick coating add-on weight of about 4.0 ounces per square yard provided a diameter of about 25 millimeters for a factor of about 0.0579 (25 mm/431.8 mm).

There are, of course, many alternative embodiments and modifications of the present invention which are intended to be included within the spirit and scope of the following claims. In particular, it is to be understood that any side curtain airbag of any production method and structure which exhibits low permeability measurements with very low laminate add-on amounts, and specifically meets the packing volume (be it as a rolled fabric, or packed accordion-style, or other packed configuration) limitations noted above is within the scope of this invention.

What is claimed is:

1. A side curtain airbag exhibiting a packing volume factor of at most 0.05 to at least a portion of the surface of which a laminate film has been applied; wherein said side curtain airbag exhibits a leak-down time after inflation of at least 5 seconds.

2. The airbag of claim 1 wherein said airbag comprises fibers possessing an average denier of at most 525.

3. The airbag of claim 2 wherein said fibers possess an average denier of at most 420.

4. The airbag of claim 3 wherein said fiber possess an average denier of at most 315.

5. A side curtain airbag exhibiting a packing volume factor of at most 0.05 to at least a portion of the surface of which a laminate film has been applied; wherein said side curtain airbag exhibits a leak-down time after inflation of at least 5 seconds; and wherein said side curtain airbag comprises at least two layers of fabric in certain discrete areas of the fabric and at least one single fabric layer at a discrete area within said fabric, wherein the weave diagram for such a side curtain airbag does not exhibit more than three consecutive unfilled blocks in any row or column.

6. The airbag of claim 5 wherein said laminate film comprises polyurethane.

7. The airbag of claim 5 wherein said airbag fabric layers are woven and comprise polyamide yarns.

8. The airbag of claim 5 wherein said airbag is a one-piece woven side curtain airbag.

9. The airbag of claim 7 wherein said polyamide yarns are formed from nylon 6,6 fiber.

10. The airbag of claim 9, wherein said polyamide yarns are multifilament yarns characterized by a average linear density of between about 210 and 630 denier.

11. The airbag of claim 10, wherein wherein said multifilament yarns are characterized by a filament linear density of about 4 denier per filament or less.

12. The airbag of claim 5 wherein said packing volume factor is at most about 0.048.

13. The airbag of claim 12 wherein said packing volume factor is at most about 0.046.

14. The airbag of claim 13 wherein said packing volume factor is at most about 0.044.

15. The airbag of claim 14 wherein said packing volume factor is at most about 0.041.

16. The airbag of claim 15 wherein said packing volume factor is at most about 0.393.

17. A side curtain airbag exhibiting a packing volume factor of at most 0.05 to at least a portion of the surface of which a laminate film has been applied; wherein said coated side curtain airbag exhibits a leak-down time after inflation of at least 5 seconds; and wherein said airbag comprises at least two layers of fabric in certain discrete areas of the fabric and at least one single fabric layer at a discrete area within said airbag, wherein only two separate weave densities are present within the area directly adjacent to said single fabric layer.

18. The airbag of claim 17 wherein said laminate film comprises polyurethane.

19. The airbag of claim 17 wherein said airbag fabric layers are woven and comprise polyamide yarns.

20. The airbag of claim 17 wherein said airbag is a one-piece woven side curtain airbag.

21. The airbag of claim 19 wherein said polyamide yarns are formed from nylon 6,6 fiber.

22. The airbag of claim 21, wherein said polyamide yarns are multifilament yarns characterized by an average linear density of between about 210 and 630 denier.

23. The airbag of claim 22, wherein wherein said multifilament yarns are characterized by a filament linear density of about 4 denier per filament or less.

24. The airbag of claim 17 wherein said packing volume factor is at most about 0.048.

25. The airbag of claim 24 wherein said packing volume factor is at most about 0.046.

26. The airbag of claim 25 wherein said packing volume factor is at most about 0.044.

27. The airbag of claim 26 wherein said packing volume factor is at most about 0.041.

28. The airbag of claim 27 wherein said packing volume factor is at most about 0.393.

29. A coated side curtain airbag exhibiting a packing volume factor of at most 0.05 to at least a portion of the surface of which a laminate film has been applied; wherein said coated side curtain airbag exhibits a leak-down time after inflation of at least 5 seconds; and wherein said airbag comprises at least two layers of fabric in certain discrete areas of the airbag and at least one narrow single fabric layer at least two discrete areas within said fabric, wherein said at least one narrow single fabric layer is formed solely from a basket weave pattern of an even number of yarns, at most 12 yarns in width, wherein at least two discrete narrow areas of single fabric layers are present within said airbag, wherein said at least two areas of single fabric layers are separated by an area of at least two layers of fabric, and wherein the width of each single layer is from 4 to 8 yarns in length.

30. The airbag of claim 29 wherein said laminate film comprises polyurethane.

31. The airbag of claim 29 wherein said airbag fabric layers are woven and comprise polyamide yarns.

32. The airbag of claim 29 wherein said airbag is a one-piece woven side curtain airbag.

33. The airbag of claim 31 wherein said polyamide yarns are formed from nylon 6,6 fiber.

34. The airbag of claim 33, wherein said polyamide yarns are multifilament yarns characterized by an average linear density of between about 210 and 630 denier.

35. The airbag of claim 34, wherein wherein said multifilament yarns are characterized by a filament linear density of about 4 denier per filament or less.

36. The airbag of claim 29 wherein said packing volume factor is at most about 0.048.

37. The airbag of claim 36 wherein said packing volume factor is at most about 0.046.

38. The airbag of claim 37 wherein said packing volume factor is at most about 0.044.

39. The airbag of claim 38 wherein said packing volume factor is at most about 0.041.

40. The airbag of claim 39 wherein said packing volume factor is at most about 0.393.

* * * * *

UNITED STATES PATENT AND TRADEMARK OFFICE
CERTIFICATE OF CORRECTION

PATENT NO.     : 6,429,155 B2
DATED          : August 6, 2002
INVENTOR(S)    : Shulong Li and John A. Sollars, Jr.

It is certified that error appears in the above-identified patent and that said Letters Patent is hereby corrected as shown below:

<u>Column 16,</u>
Line 54, the word "yams" has been corrected to read -- yarns --.

<u>Column 18,</u>
Lines 20, 23 and 24, the word "yams" has been corrected to read -- yarns --.

Signed and Sealed this

Fourteenth Day of January, 2003

JAMES E. ROGAN
*Director of the United States Patent and Trademark Office*